(12) United States Patent
Babinchak

(10) Patent No.: US 9,597,996 B2
(45) Date of Patent: Mar. 21, 2017

(54) SLING PROTECTION PAD

(71) Applicant: LIFT-ALL COMPANY, INC., Landisville, PA (US)

(72) Inventor: Gregory S. Babinchak, Elizabethtown, PA (US)

(73) Assignee: Lift-All Company, Inc., Landisville, PA (US)

( * ) Notice: Subject to any disclaimer, the term of this patent is extended or adjusted under 35 U.S.C. 154(b) by 0 days.

(21) Appl. No.: 14/460,442

(22) Filed: Aug. 15, 2014

(65) Prior Publication Data

US 2016/0046465 A1 Feb. 18, 2016

(51) Int. Cl.
*B60P 7/08* (2006.01)

(52) U.S. Cl.
CPC .................................. *B60P 7/0869* (2013.01)

(58) Field of Classification Search
CPC .................................................... B60P 7/0869
USPC .............. 410/41, 99, 97, 155; 206/453, 586; 294/74; 248/345.1
See application file for complete search history.

(56) References Cited

U.S. PATENT DOCUMENTS

| | | | |
|---|---|---|---|
| 2,903,291 | A | 9/1959 | Barthule |
| 2,985,480 | A * | 5/1961 | Otley ........................ B66C 1/18 105/354 |
| 3,290,083 | A | 12/1966 | Norton |
| 3,466,080 | A | 9/1969 | Norton |
| RE26,704 | E | 11/1969 | Norton |
| 4,039,217 | A | 8/1977 | Bryant |
| 4,039,218 | A | 8/1977 | Bryant |
| 4,124,244 | A | 11/1978 | Bryant |
| 4,441,748 | A | 4/1984 | St. Germain |
| 5,492,383 | A | 2/1996 | Kentner, Sr. |
| 6,149,215 | A | 11/2000 | Balogh et al. |
| 6,470,637 | B2 | 10/2002 | Gratz |
| 7,311,483 | B1 * | 12/2007 | Nudo .............................. 410/41 |
| 7,744,138 | B2 | 6/2010 | St. Germain |
| 8,672,375 | B2 | 3/2014 | Conrad |

FOREIGN PATENT DOCUMENTS

JP 64034891 A 2/1989

\* cited by examiner

*Primary Examiner* — Stephen Gordon
(74) *Attorney, Agent, or Firm* — McNees Wallace & Nurick LLC

(57) ABSTRACT

A flexible lifting member protection pad includes a cut protection area with strengthening stitching which cooperates with an inner ply and an outer ply to bind the inner ply and the outer ply together in the cut protection area, such that the inner ply, outer ply and strengthening stitching act and move as one piece to increase the combined cutting resistance of the cut protection area. The strengthening stitching is distributed or applied systematically across substantially the entire cut protection area. This configuration allows compression to be generated across the inner ply of the cut protection area when the protection pad is moved against the edge of the load, whereby the inner ply of the cut protection area resists being cut by the edge of the load.

11 Claims, 4 Drawing Sheets

SLING PROTECTION PAD

FIELD OF THE INVENTION

The present invention is directed to sling protectors and, in particular, to sling protectors for use with industrial slings that are designed to lift heavy loads, the sling protectors the slings from damage from edges of the loads.

BACKGROUND OF THE INVENTION

Industrial slings are often used to lift and move heavy objects at shipping yards, construction sites, loading areas, and in a wide variety of other applications. While industrial slings were previously made from chains and wire cables, many of today's slings (e.g., those employed in the last two decades) are generally made of tough and durable fibers. These fiber slings can be subject to catastrophic failure if they are cut, subjected to abrasion, or are otherwise worn down. This type of damage can occur when the object being lifted or pulled has a sharp corner or edge, and the sling is held taught against the edge during the lifting or pulling operation or the sling is moved relative to the object as the sling is in contact with the edge.

There are a number of ways the problem of sling degradation and failure has been addressed in the past, such as for example, through the use of eye bolts/hooks or through the use of angular pieces of cardboard or foam that abut against edges of the objects to be moved (e.g., U.S. Pat. No. 6,470,637 to Gratz describes molded pulp corner protector to protect windows during shipment). Many of these solutions are costly are relatively inefficient and ineffective.

Another solution is to provide a corner pad such as that described in U.S. Pat. No. 7,744,138 to St. Germain, which is herein incorporated by reference. The pad forms a tunnel between load edge and the pad so that the pad, as well as the underlying sling, is protected from contacting the load edge during lifting or pulling. Similarly, the sling protective pad described in U.S. Pat. No. 8,672,375 to Conrad, which is herein incorporated by reference, includes fasteners on a sleeve forming member which are secured together to encircle and secure the protective pad on an industrial sling at a desired location. Pockets formed in the protective pad house a pair of block spacers which, in one configuration, serve to space the protective pad and underlying sling away from the load which is being lifted or pulled. However, these corner pads are somewhat cumbersome and difficult to properly position.

In addition, the pads currently known in the industry have multiple plies of webbing material such that the plies not in direct with the cutting edge of the load which tend to separate away from the cutting edge of the load, thereby making the inner pads more susceptible to being cut by the edge of the load.

A protective sling that shows one or more improvements in comparison to the prior art would be desirable in the art. In particular, it would be beneficial to have a pad with a cut protection area in which stitching provided across the cut protection area will prevent the inner ply(ies) of the webbing material from separating when exposed to an edge of the load, thereby generating web compression on the inner ply(ies) to increase resistance to cutting.

SUMMARY OF THE INVENTION

An embodiment is directed to a flexible lifting member protection pad for insertion between an edge of a load to be lifted and a lifting member. The lifting member protection pad includes an outer ply and an inner ply. A cut protection area is provided having strengthening stitching which cooperates with the inner ply and the outer ply to bind the inner ply and the outer ply together in the cut protection area. The strengthening stitching is applied systematically across substantially the entire cut protection area. As the lifting member is engaged, the lifting member protection pad is moved against and generally conforms to the edge of the load, generating compression across the inner ply of the cut protection area, such that the inner ply of the cut protection area resists being cut by the edge of the load.

An embodiment is directed to a sling protection pad for insertion between an edge of a load to be lifted and a sling. The sling protection pad includes at least one outer ply and at least one inner ply. Strengthening stitching is applied to a portion of the at least one outer ply and the at least one inner ply to form a cut protection area. The strengthening stitching is applied systematically across the entire cut protection area and binds the inner ply to the outer ply in the cut protection area. As the sling protection pad is moved against the edge of the load, the at least one inner ply of the cut protection area is compressed, such that the at least one inner ply of the cut protection area resists being cut by the edge of the load.

An embodiment is directed to a flexible lifting member protection pad for insertion between an edge of a load to be lifted and a lifting member. The lifting member protection pad includes a cut protection area. The cut protection area has multiple plies of webbing bonded together using strengthening stitching applied through the multiple plies. The strengthening stitching is distributed over the entire cut protection area. The cooperation of the strengthening stitching and the multiple plies of webbing cooperate to generate compression across an inner ply of the multiple plies of the cut protection area, such that the inner ply of the cut protection area resists being cut by the edge of the load as the inner ply engages the ends of the load.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
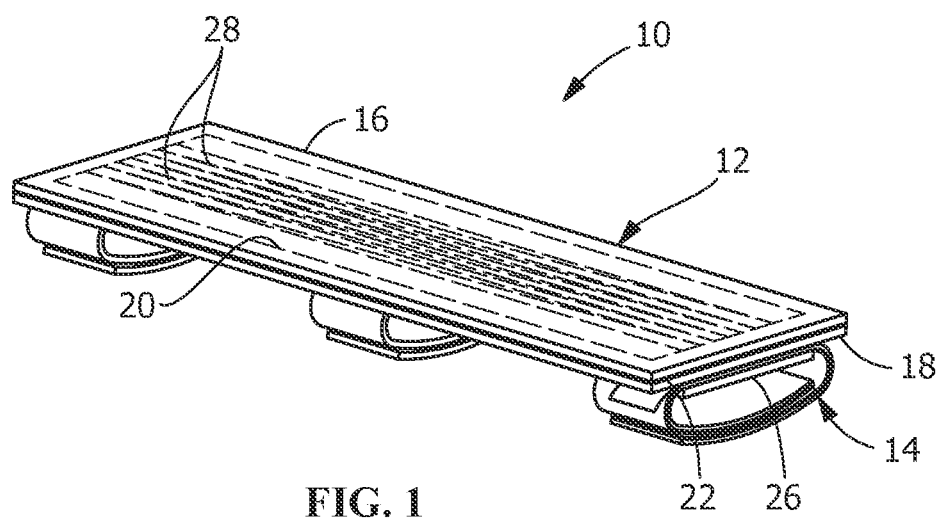
FIG. 1 is a top perspective view of an illustrative edge protector in accordance with the present invention.

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as "top", "width", "length" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

Illustrative embodiments of the present invention will now be described in detail with reference to the accompanying drawings in which a sling protection pad in accordance with the present invention is generally referred to as referenced numeral 10.

In this disclosure, an edge/corner of a load is defined as the elongated seam or corner formed when at least two sides of an object meet. The most familiar type of edge is the 90 degree angle formed by two sides of a rectangular-shaped object. However, an edge can be formed by joining two sides at virtually any angle. In fact, if an angle formed from two sides of an object is less than a right angle, the edge tends to be sharper. The present invention may be used to protect a sling from any sharp edge or surface on the load to be lifted.

As disclosed herein, a sling protection pad constructed of multiple plies of webbing or other material, such as, but not limited to, nylon, polyester, aramid, UHMPE, felt, leather and/or other sewable forms of material, is provided, whereby strengthening stitching binding the plies together is distributed over essentially the entire protection area to generate compression across the inner ply when the pad is bent over an edge. In the illustrative embodiment shown, the stitching is applied or distributed over the entire protection area, i.e. over every square inch of the protection area.

The number of sling protection pads 10 used will depend on the shape of the load to be lifted and the number of slings used to lift the load. It is desirable to use a sling protection pad 10 in every location where the sling will come in contact with an edge/corner of the load.

Figure 2:
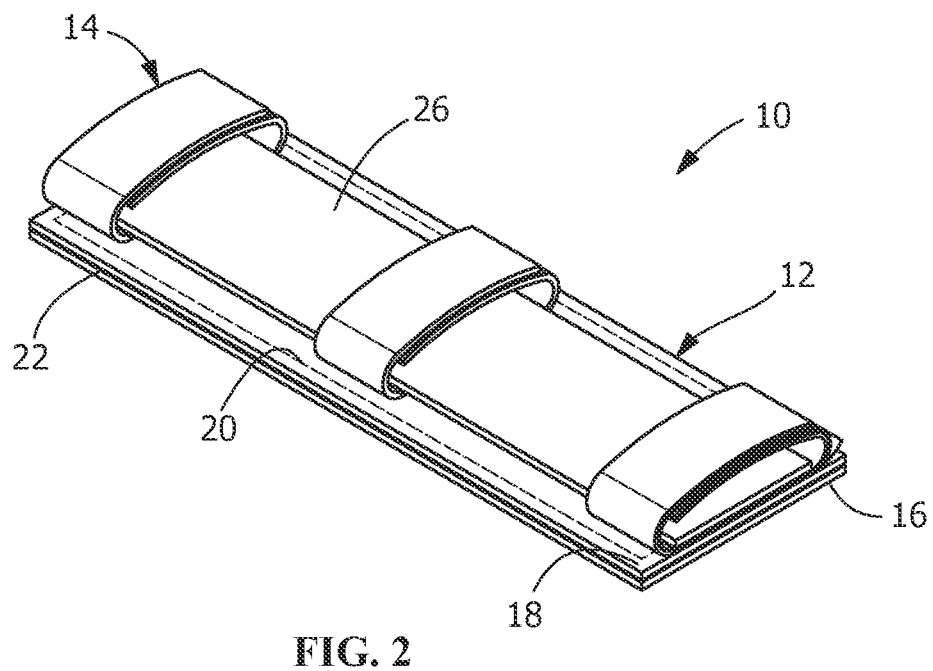
FIG. 2 is a bottom perspective view of the edge protector shown in FIG. 1.

Referring to FIGS. 1 and 2, the sling protection pad 10 includes a body portion 12 and securing members 14. In the illustrative embodiment shown, the body portion 12 has a generally rectangular shape and is of a material which has the flexibility to conform to the shape of the load and which has the strength characteristics required. However, the body portion 12 may have other shapes without departing from the scope of the invention. Materials that can be used include, but are not limited to, nylon, polyester, felt, leather, aramid, UHMPE, and/or other sewable forms of materials. The length of the body portion 12 will generally depend on the shape/design of the load to be lifted. The width of the body portion 12 will generally depend on the width of the sling 32 used to lift the load. In an illustrative embodiment, the body portion 12 has an eighteen-inch length and a width of six inches.

Figure 3:
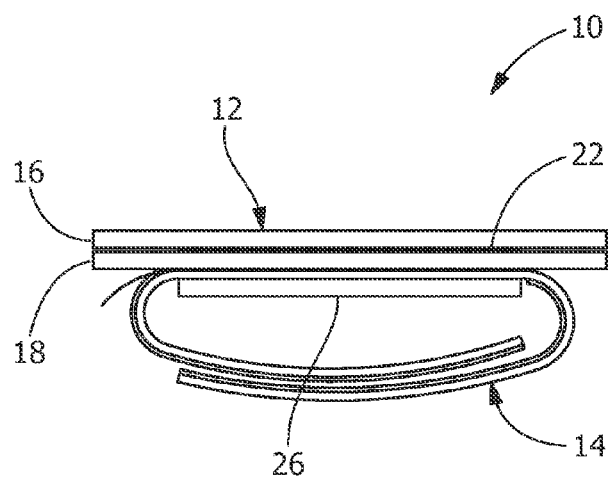
FIG. 3 is an end view of the edge protector shown in FIG. 1.

The body portion 12 may be made from two or more pieces of fabric or webbing. As best shown in FIG. 3, in the illustrative embodiment, a first rectangular-shaped piece of material or ply 16 is placed over a second rectangular-shaped piece of material or ply 18. The ply 16 and ply 18, which have essentially the same dimensions, are stitched together by perimeter stitching 20 (FIG. 1) proximate their four sides. In the embodiment shown, nylon thread is used; however other thread having similar strength and pliability characteristics can be used. In various illustrative embodiments, a wear indicator 22 is positioned between the plies 16, 18. The wear indicator 22 generally has a different color or appearance than the plies 16, 18. The wear indicator 22 is exposed if the ply 16 or ply 18 is cut or worn, thereby providing a visual indication that the sling protection pad 10 may need to be replaced or repaired.

Alternatively, the body portion 12 may be formed from one elongated piece of material twice as long or twice as wide as the desired length or width of the body portion 12. The enlarged piece of material is then folded in half and the remaining three edges stitched together along the longitudinal edges of the body section 12 to form ply 16 and the ply 18. The first ply 16 and the second ply 18 form outer plies of the embodiment shown.

In the illustrative embodiment shown in FIGS. 1 through 5 the body portion 12 includes a third piece of material or inner ply 26 which is attached to the other plies 16, 18. In the illustrative embodiment shown, the ply 26 has a generally rectangular shape which has a width smaller than the width of the outer plies 16, 18. The inner ply 26 is made of a material which has the flexibility to conform to the shape of the load and which has the strength characteristics required. However, the inner ply 26 may have other shapes without departing from the scope of the invention. Materials that can be used include, but are not limited to, nylon, polyester, felt, leather, aramid, UHMPE, and/or other sewable forms of materials. The length of the inner ply 26 will generally depend on the shape/design of the load to be lifted. The width of the inner ply 26 will generally depend on the width of the sling 32 and the width of plies 16, 18. In an illustrative embodiment, the inner ply 26 has an eighteen-inch length and a width of four inches.

The inner ply 26 is attached to the outer plies 16, 18 by strengthening stitching 28 Kevlar thread. In the embodiment shown, Kevlar thread is used, however, other thread materials can be used, such as, but not limited to, nylon thread, polyester thread and/or aramid thread. In the embodiment shown, the strengthening stitching 28 is in a zigzag pattern which systematically extends across the entire width or substantially the entire width and length of the inner ply 26. However, other configurations of systematically applying the strengthening stitching 28 may be used, such as, but not limited, to each row of stitching being positioned parallel or essentially parallel to each other. The strengthening stitching 28 extends through the inner ply 26 and the outer plies 16, 18. The inner ply 26 cooperates with the outer plies 16, 18 to form a cut protection area 30 which cooperates with the lifting member or sling 32 (FIGS. 4 and 5) as will be more fully described. In the illustrative embodiment shown, each row of stitching 28 is proximately located within ¼ inch, ½ inch, ¾ inch, between ¼ inch and ¾ inch, greater than ¼ inch, or any combination or sub-combination thereof, of each adjacent row of strengthening stitching 28 across the entire protection area 30.

Figure 4:
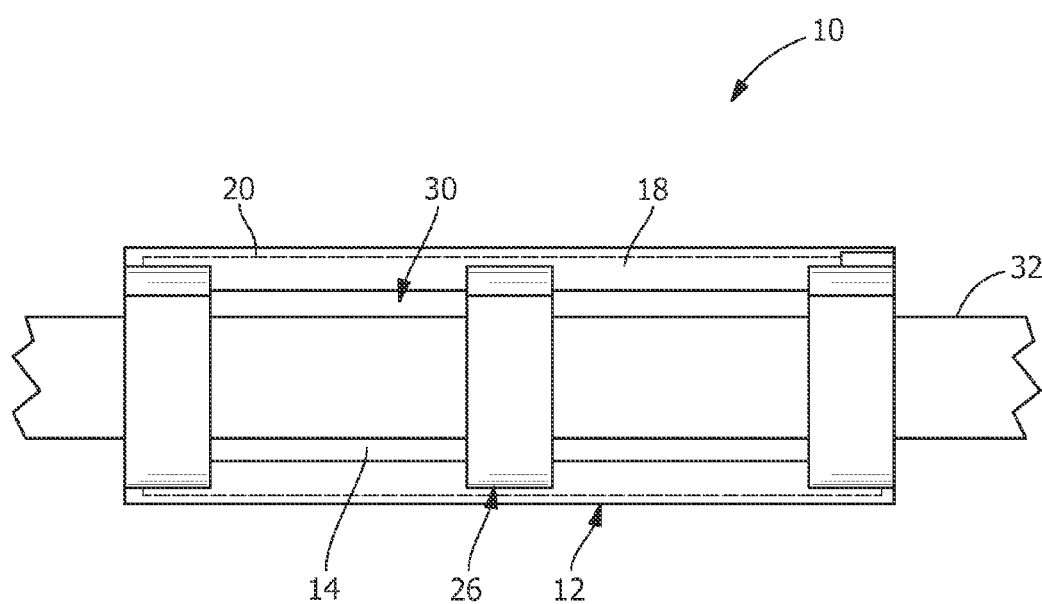
FIG. 4 is a bottom view of the edge protector of FIG. 1 with a representative sling shown in engagement therewith.

In various applications, the width of the cut protection area 30 is less than the width of the body portion 12. In the illustrative embodiment shown in FIGS. 1 through 5, and as best shown in FIGS. 2 and 4, the width of body portion 12 is approximately two inches, greater than one inch, greater than two inches or any combination or sub-combination thereof, greater than the width of the cut protection area 30, with approximately one inch, greater than ½ inch, greater than 1 inch or any combination or sub-combination thereof, extending from each side of the cut protection area 30. This provides enhanced cut protection for the sling 32, as will be more fully described.

The application of the strengthening stitching 28 distributed systematically across the entire cut protection area 30 prevents the inner ply 26 from separating from the outer plies 16, 18 and generates web compression between the outer ply 16, the outer ply 18 and the inner ply 26. As the inner ply 26, outer ply 16, outer ply 18 and strengthening stitching 28 act and move as one piece, the combined cutting resistance of the outer ply 16, the outer ply 18, the inner ply 26 and the strengthening stitching 28 in the cut protection area 30 is increased.

Securing members 14, provided proximate the cut protection area 30, are used to attach the sling protection pad 10 to the sling 32. In the embodiment shown, the securing members 14 are straps which have a longitudinal axis which is essentially perpendicular to the longitudinal axis of the body portion 12. Mounting portions of the securing members 14 extend between the inner ply 26 and the outer ply 18 and are secured therein by strengthening stitching 28. Each securing member includes a first fastening section 34 and a second fastening section 36. Hook or loop type fasteners are provided on respective sections 34, 36. By wrapping the securing members 14 around a sling 32 (so that the loop-type fasteners face away from the sling), the sling protection pad 10 can be releasably secured to the sling 32 in a manner known in the industry. Other types and/or configurations of securing members 14 may be used without departing from the scope of the invention.

Figure 5:
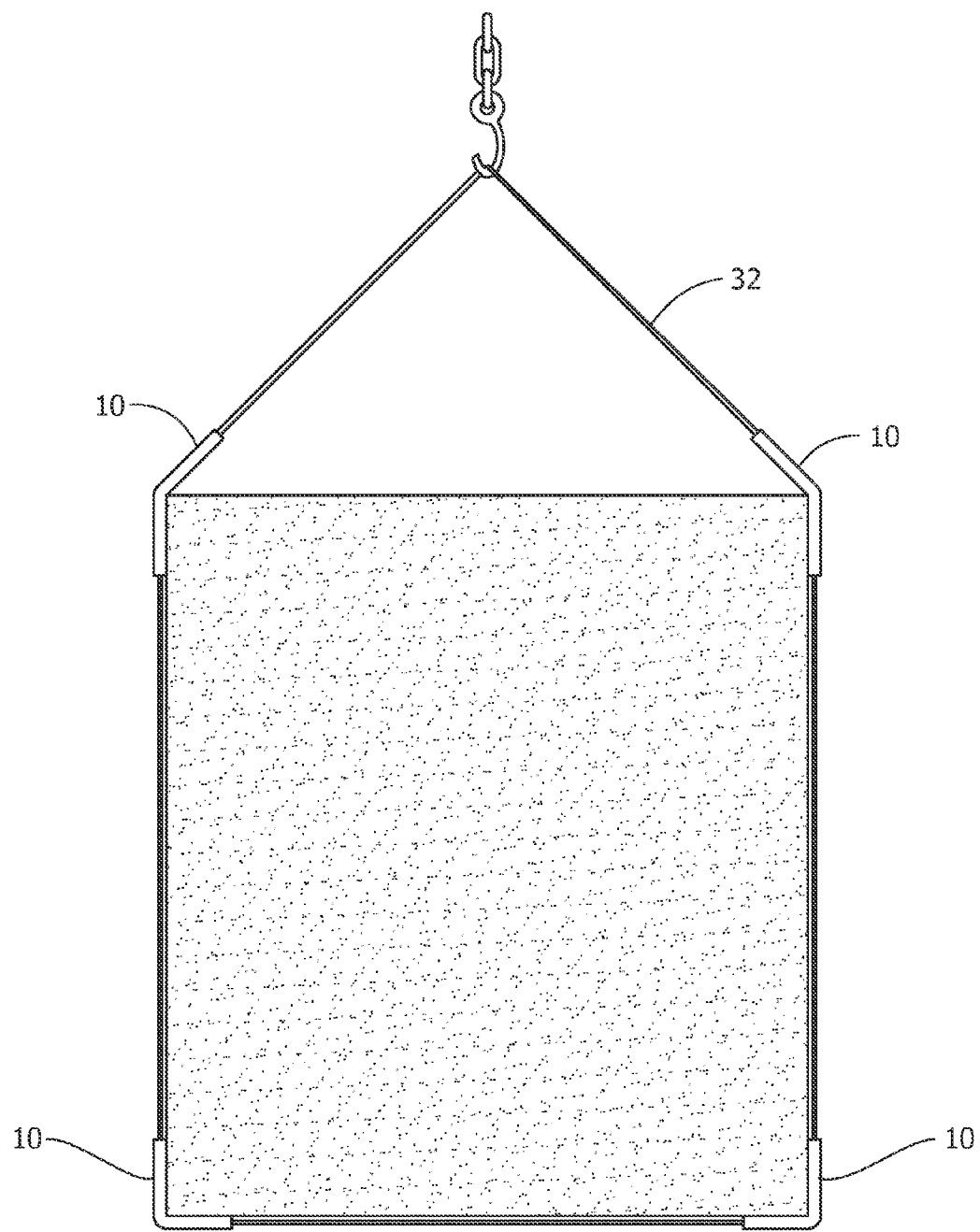
FIG. 5 is a side view of the several edge protectors, as shown in FIG. 1, abutted against a corner of a load.

In use, the flexible sling protection pad 10 is removeably attached to the lifting member or sling 32. The sling protection pad 10 is then moved into position proximate the edge of the load to be lifted, as best shown in FIG. 5. With the sling 32 and sling protection pad 10 properly positioned, the sling 32 can be lifted, which in turn causes the sling protection pad 10 to be moved against and generally conform to the edge of the load. The sling protection pad 10 provides increased protection to prevent the sling 32 from directly contact the edge, thereby protecting the sling 32 from unwanted wear or cutting. As the multiple layers or plies 16, 18, 26 of the webbing are bound uniformly across the cut protection area 30, compression is generated through the inner most positioned material layer or inner ply 26 when the sling protection pad 10 is bent across an edge of the load.

When the sling protection pad 10 is positioned on the sling 32, the sling 32 is captured by the securing members 14 and positioned in the cut protection area 30. However, as the lifting forces are applied to the sling 32, the sling 32 may move in a direction laterally of the longitudinal axis of the body portion 12 while still be secured by the securing members 14. If this movement of the sling 32 occurs, a portion of the sling 32 may be moved to the side of the inner ply 26 and to the side of the cut protection area 30. However, as the outer plies 16, 18 extend beyond the inner ply 26, the sling 32 will engage the outer ply 18 if such movement occurs, preventing the sling 32 from engaging the edge of the load, thereby protecting the sling 32 from unwanted wear or cutting. The outer plies 16, 18 are dimensioned to prevent the movement of the sling 32 laterally of the body portion 12 of the sling protection pad 10 when the securing members 14 are properly secured around the sling 32, thereby ensuring that the securing members 14 cooperate with the inner ply 26 and other plies 16, 18 to prevent the sling 32 from engaging the load.

Figure 6:
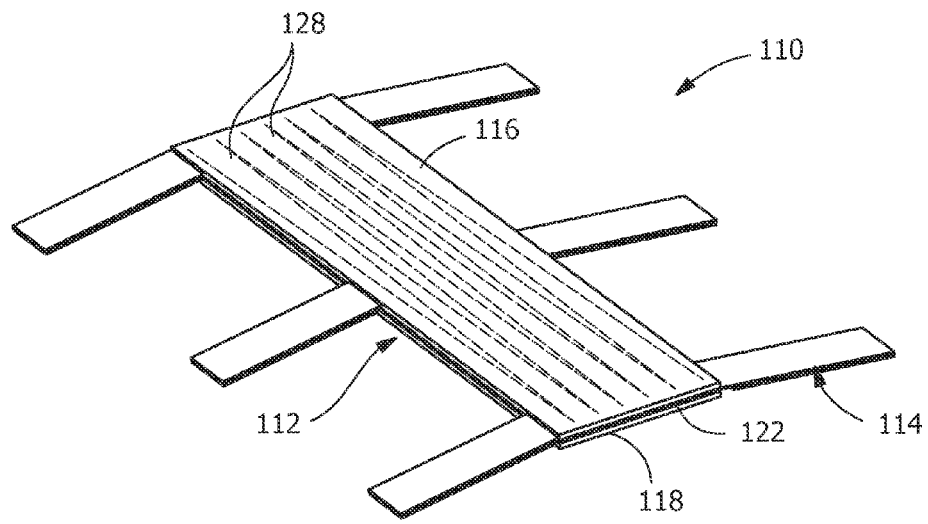
FIG. 6 is a perspective view of a second illustrative edge protector in accordance with the present invention.
Figure 7:
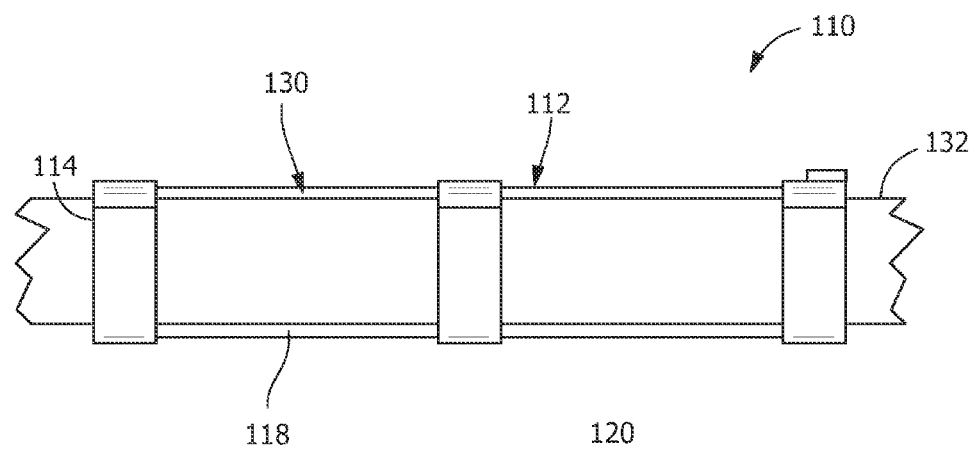
FIG. 7 is a perspective view of the edge protector of FIG. 6 with a representative sling shown in engagement therewith.

A second illustrative embodiment is shown in FIGS. 6 and 7. In this embodiment, the sling protection pad 110 includes a body portion 112 and securing members 114. In the illustrative embodiment shown, the body portion 112 has a generally rectangular shape and is of a material which has the flexibility to conform to the shape of the load and which has the strength characteristics required. However, the body portion 112 may have other shapes without departing from the scope of the invention. Materials that can be used include, but are not limited to, nylon, polyester, felt, leather, aramid, UHMPE, and/or other sewable forms of materials. The length of the body portion 112 will generally depend on the shape/design of the load to be lifted. The width of the body portion 112 will generally depend on the width of the sling 132 used to lift the load. In an illustrative embodiment, the body portion 112 has an eighteen-inch length and a width of three inches.

The body portion 112 may be made from two or more pieces of fabric or webbing. In the illustrative embodiment shown in FIG. 7, a first rectangular-shaped piece of material or outer ply 116 is placed over a second rectangular-shaped piece of material or inner ply 118. In various illustrative embodiments, a wear indicator 122 is positioned between the plies 116, 118. The wear indicator 122 generally has a different color or appearance than the outer and inner plies 116, 118. The wear indicator 122 is exposed if the ply 116 or ply 118 is cut or worn, thereby providing a visual indication that the sling protection pad 110 may need to be replaced or repaired.

Alternatively, the body portion 112 may be formed from one elongated piece of material twice as long or twice as wide as the desired length or width of the body portion 112. The enlarged piece of material is then folded in half to form ply 116 and the ply 118.

The inner ply 118 is secured or stitched to the outer ply 116 by strengthening stitching 128. In the embodiment shown, Kevlar thread is used. However, other thread materials can be used, such as, but not limited to, nylon thread, polyester thread and/or aramid thread. In the embodiment shown, the strengthening stitching 128 is in a zigzag pattern which systematically extends across the entire width or substantially the entire width and length of the inner ply 118. However, other configurations of systematically applying the strengthening stitching 128 may be used, such as, but not limited, to each row of stitching being positioned parallel or essentially parallel to each other. The strengthening stitching 128 extends through the inner ply 118 and the outer plies 116. The inner ply 118 cooperates with the outer plies 116 to form a cut protection area 130 which cooperates with the lifting member or sling 132 (FIG. 7) as will be more fully described. In the illustrative embodiment shown, each row of stitching 128 is proximately located within ¼ inch, ½ inch, ¾ inch, between ¼ inch and ¾ inch, greater than ¼ inch, less than ¾ inch, or any combination or sub-combination thereof, of each adjacent row of strengthening stitching 128 across essentially the entire protection area 130.

In this embodiment, the inner ply 116 and the outer ply 118 are essentially the same width. In the illustrative embodiment, the stitching does not extend to the edges 140 of the sling protection pad 110. The stitching begins approximately 1 inch, ½ inch, less than 1 inch or any combination or sub-combination thereof from each side edge 140. This provides enhanced cut protection for the sling 132, as will be more fully described.

The application of the strengthening stitching 128 distributed systematically across the entire cut protection area 130 prevents the inner ply 118 from separating from the outer ply 116 and generates web compression between the outer ply 116 and the inner ply 118. As the inner ply 118, outer ply 118 and strengthening stitching 128 are bound together to act and move as one piece, the combined cutting resistance of the outer ply 116, the inner ply 118 and the strengthening stitching 128 in the cut protection area 130 is increased.

Securing members 114 are used to attach the sling protection pad 110 to the sling 132. In the embodiment shown, the securing members 114 are straps which have a longitudinal axis which is essentially perpendicular to the longitudinal axis of the body portion 112. Mounting portions of the securing members 114 extend between the inner ply 118 and the outer ply 116. The mounting portions of the securing members are secured to the body portion 112 by strengthening stitching 128. Each securing member 114 includes a first fastening section 134 and a second fastening section 136. Hook or loop type fasteners are provided on respective sections 134, 136. By wrapping the securing members 114 around a sling 132 (so that the loop-type fasteners face away from the sling), the sling protection pad 110 can be releasably secured to the sling 132 in a manner known in the industry. Other types and/or configurations of securing members 114 may be used without departing from the scope of the invention.

In use, the flexible sling protection pad 110 is removeably attached to the lifting member or sling 132. As the securing members 114 are tightened, the material of the inner ply 118 proximate the edges 140 which is not stitched is curled inward by the securing members 114 to form a raised edge or lip 142, as shown in FIG. 7.

The sling protection pad 110 is then moved into position proximate the edge of the load to be lifted, as best shown in FIG. 7. With the sling 132 and sling protection pad 110 properly positioned, the lifting member or sling 132 can be lifted, which in turn causes the sling protection pad 110 to be moved against and generally conform to the edge of the load. The sling protection pad 110 provides increased protection to prevent the sling 132 from directly contact the edge, thereby protecting the sling 132 from unwanted wear or cutting. As the multiple layers or plies 116, 118 of the webbing are bound uniformly across the cut protection area 130, compression is generated through the inner most positioned material layer or ply 118 when the sling protection pad 110 is bent across an edge.

In use, the sling 132 is captured by the securing members 114 and positioned in the cut protection area 130. As forces are applied to the sling 132, the sling 132 may attempt to move in a direction laterally of the longitudinal axis of the body portion 112 while still be secured by the securing members 114. However, the movement of the sing 132 outside of the cut protection area 130 is prohibited by the interaction of the raised edge or lip 142 with the sling 132. The raised edge or lip 142 acts as a stop to prevent the further movement of the sling 132 out of the cut protection area 130. This prevents the sling 132 from engaging the edge of the load, protecting the sling 132 from unwanted wear or cutting.

Regardless of the embodiment, the sling protection pad includes a cut protection area with strengthening stitching which cooperates with an inner ply and an outer ply to bind the inner ply and the outer ply together in the cut protection area, such that the inner ply, outer ply and strengthening stitching act and move as one piece to increase the combined cutting resistance of the cut protection area. The strengthening stitching is distributed or applied systematically across substantially the entire cut protection area. This configuration allows compression to be generated across the inner ply of the cut protection area when the protection pad is moved against the edge of the load, whereby the inner ply of the cut protection area resists being cut by the edge of the load.

While the invention has been described with reference to an illustrative embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments and methods are therefore to be considered in all respects as illustrative and not restrictive, the scope of the invention being defined by the appended claims, and not limited to the foregoing description or embodiments.

The invention claimed is:

1. A flexible lifting member protection pad for insertion between an edge of a load to be lifted and a lifting member, the lifting member protection pad comprising:
    an outer ply;
    an inner ply;
    a cut protection area, the cut protection area having strengthening stitching which cooperates with the inner ply and the outer ply in the cut protection area to bind the inner ply and the outer ply together in the cut protection area, the strengthening stitching being applied in rows systematically across substantially the entire cut protection area to prevent the inner ply from separating from the outer ply and to generate web compression between the outer ply and the inner ply in the cut protection area, causing the inner ply and outer ply in the cut protection area to move as one piece, wherein the combined cutting resistance of the outer ply and the inner ply in the cut protection area is increased, each row of the strengthening stitching is applied within ½ inch of each adjacent row of the strengthening stitching;
    a second outer ply attached to the outer ply, the second outer ply having essentially the same dimensions as the outer ply;
    the outer ply and the second outer ply include perimeter stitching;
    wherein as the lifting member is engaged, the lifting member protection pad is moved against and generally conforms to the edge of the load.

2. The flexible lifting member protection pad as recited in claim 1, wherein the inner ply has smaller dimensions than the outer ply.

3. The flexible lifting member protection pad as recited in claim 1, wherein the strengthening stitching is Kevlar thread.

4. The flexible lifting member protection pad as recited in claim 1, wherein the strengthening stitching is applied in a zigzag pattern which extends across substantially the entire width of the inner ply to form the cut protection area.

5. The flexible lifting member protection pad as recited in claim 1, wherein the strengthening stitching is applied in a parallel or substantially parallel pattern which extends across substantially the entire width of the inner ply to form the cut protection area.

6. The flexible lifting member protection pad as recited in claim 1, wherein securing members are provided proximate the cut protection area, the securing members are used to attach the flexible lifting member protection pad to the lifting member.

7. The flexible lifting member protection pad as recited in claim 6, wherein the securing members extend between the inner ply and the outer ply, the securing members are secured between the inner ply and the outer ply by the strengthening stitching.

8. A sling protection pad for insertion between an edge of a load to be lifted and a sling, the sling protection pad comprising:
   at least one outer ply;
   at least one inner ply;
   strengthening stitching applied to a portion of the at least one outer ply and the at least one inner ply to form a cut protection area, the strengthening stitching being applied in rows systematically across the entire cut protection area, each row of the strengthening stitching is applied within ½ inch of each adjacent row of the strengthening stitching, the strengthening stitching binds the inner ply to the outer ply in the cut protection area to prevent the inner ply from separating from the outer ply and to generate web compression between the outer ply and the inner ply, causing the inner ply and outer to move as one piece, wherein the combined cutting resistance of the outer ply and the inner ply of the cut protection area is increased;
   securing members are provided proximate the cut protection area and are used to attach the sling protection pad to the sling, the securing members cooperate with the at least one inner ply and the at least one outer ply to prevent the sling from engaging the load;
   wherein as the sling protection pad is moved against the edge of the load, the at least one inner ply of the cut protection area resists being cut by the edge of the load.

9. The sling protection pad as recited in claim 8, wherein the at least one outer ply is two outer plies, the two outer plies having essentially the same dimensions.

10. The sling protection pad as recited in claim 9, wherein the inner ply has smaller dimensions than the two outer plies.

11. The sling protection pad as recited in claim 8, wherein the securing members are used to attach the sling protection pad to the sling.

\* \* \* \* \*